Oct. 16, 1934.  A. P. BEREJKOFF ET AL  1,977,334
STOP MECHANISM
Filed Jan. 18, 1934
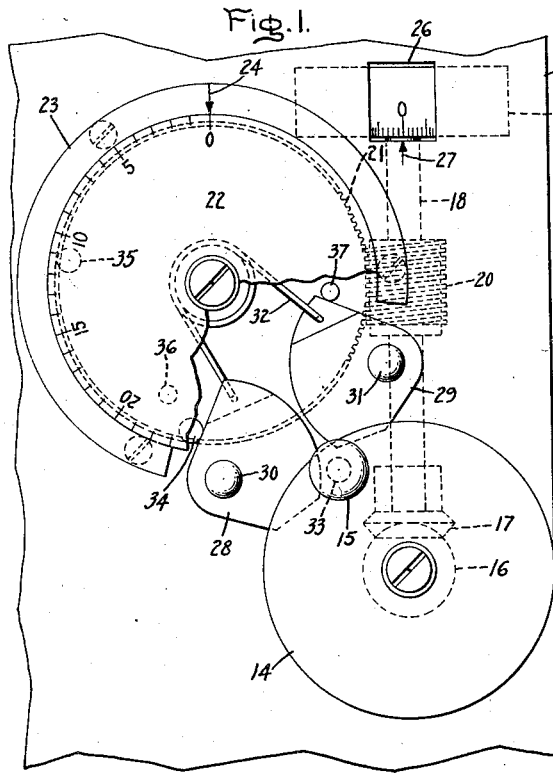
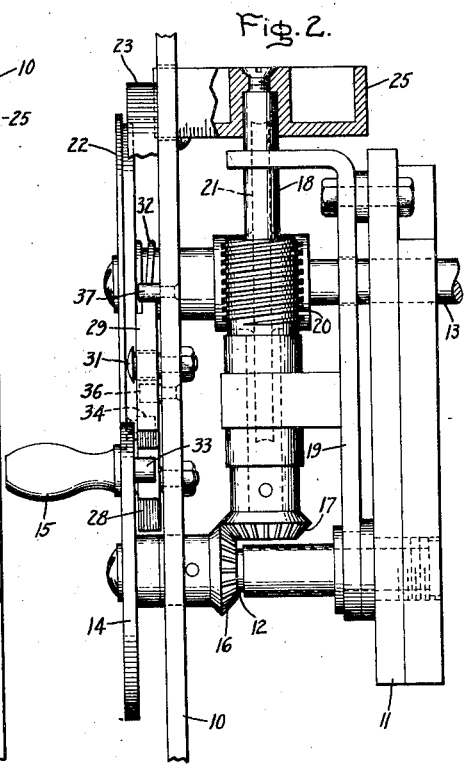
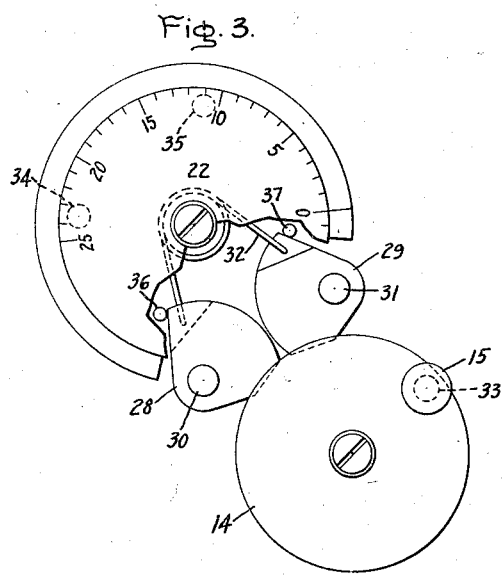
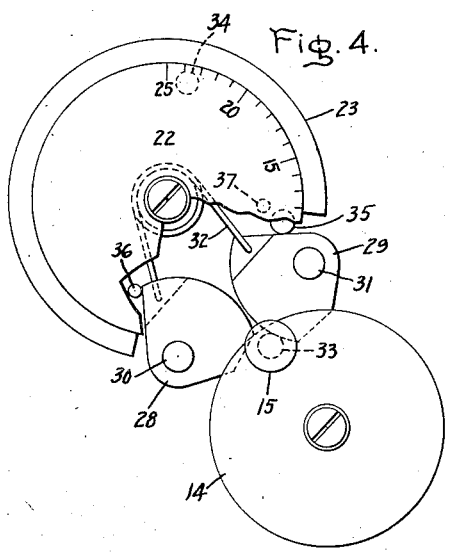
Inventors:
Anatole P. Berejkoff,
Francis C. Brockman,
by Harry E. Dunham
Their Attorney.

Patented Oct. 16, 1934

1,977,334

UNITED STATES PATENT OFFICE 1,977,334

STOP MECHANISM

Anatole P. Berejkoff and Francis C. Brockman, Schenectady, N. Y., assignors to General Electric Company, a corporation of New York Application January 18, 1934, Serial No. 707,231

5 Claims. (Cl. 192—139)

The present invention relates to stop mechanisms for automatically stopping a rotary device, more particularly to the kind of mechanisms used for limiting the angle of rotation of a rotary element driven by a crank or similar driving means at reduced speed through a reducing gearing or the like. Arrangements of this type may be used in wireless telegraphy in connection with sending and receiving apparatus, or in connection with variometers, variable capacitors or rotating inductors with sliding contact and the like.

In arrangements of this nature the driven device may be provided with a dial, indicating the angle of rotation which is usually less than a complete rotation. The crank or knob is rotated several times for a fraction of a complete rotation of the driven device or dial. As the driven device in many cases includes sensitive elements, such as capacitors or coils on which no strains should be applied, it is desirable to provide stop means which in certain positions of the driven device directly lock the crank or driving means. The direct locking of the crank is important as the shock of stopping the device is then taken directly by the driving member and not after such force has been multiplied by the ratio of the speed reducing mechanism.

The object of our invention is to provide an improved means for accurately stopping the driven means in its end position or positions by directly stopping the crank or driving means at a certain position of the driven means.

For consideration of what we believe to be novel and our invention, attention is directed to the following description and the claims appended thereto in connection with the accompanying drawing which forms a part of our specification.

In the drawing, Fig. 1 is a front view of an apparatus embodying our invention; Fig. 2 illustrates a side view of Fig. 1 partly broken away; and Figs. 3 and 4 are front views on a smaller scale of the apparatus shown in Fig. 1 in different operating positions.

The apparatus comprises a front panel 10 and a frame 11 for supporting a driving shaft 12 and a driven shaft 13. The driving shaft 12 projects through the panel and carries a disk 14 with a handle 15. The disk together with the handle represent in substance a crank. The driven shaft 13 is coupled with the driving shaft 12 by means of a reducing gearing including a beveled gear 16 fastened to the shaft 12 and meshing with a beveled gear 17 held on one end of a shaft 18. The shaft 18 is supported by a bracket 19 fastened to the frame 11. A worm 20 is provided on the shaft 18 and meshes with a worm gear 21 fastened to the driven shaft 13. The driven shaft 13 carries in front of the panel a dial 22 concentrically arranged with a segment 23 having a hairline 24 for indicating the position of the dial. The shaft 13 together with the dial form a part of a device driven by the crank.

The arrangement may be such that the crank has to be turned fifty times for one complete rotation of the dial. To permit accurate reading, another indicating disk or dial 25 is fastened to the shaft 18. The disk 25 has a circumferential portion projecting through an opening 26 in the panel. The disk is provided with a scale and the correct reading of the position is facilitated by a hairline 27 on the panel 10. The arrangement so far described is generally known in the art and is illustrative of various devices to which our invention may be applied.

In accordance with our invention we provide improved means for limiting the angle of rotation of the dial 22. In the present instance this limited angle of rotation has been fixed at 180 angular degrees. This is accomplished by the provision of two rotatable cam members 28 and 29 pivoted at 30 and 31 respectively on the panel 10. The two cam members or cams are normally held in a certain position by spring means. In the present instance they are connected by a single spring 32 wound about an end portion of the shaft 13 for normally biasing the two cams inwardly, that is, away from the disk 14, which latter forms a part of the crank. A pin 33 is fastened to the crank, in the present instance forming a projection of the handle 15. Two rotatable or movable stops 34 and 35 are fastened to the dial and two stationary or fixed stops 36 and 37 are fastened to the panel. The spring 32 biases the cam against the fixed stops 36 and 37 respectively.

The arrangement is shown in Fig. 1 after the crank has been moved in counterclockwise direction into an end position of the dial in which its zero mark registers with the hairline 24. In this position the cam 28 has been turned in clockwise direction by the rotating pin 34 and thereby moved into the path of the pin 33 of the crank, thus preventing the crank from being rotated further in counterclockwise direction. The device as shown in Fig. 1 can be turned only in clockwise direction. It will be noted that in the present example the direction of rotation of both the crank and the device is the same, that is, either clockwise or counter-clockwise, due to their connection by the reducing gearing.

Fig. 3 shows the arrangement of Fig. 1 after the crank has been turned several times in clockwise direction. The rotatable pin 34 has been moved away from the cam 28, permitting the spring to move the cam inwardly, that is, out of the path of the crank or driving means. Both cams 28 and 29 in this operating condition assume a symmetrical position, each of them being biased towards one of the stationary stops 36 and 37.

Fig. 4 shows the arrangement with the crank turned further in clockwise direction until the other end position has been reached in which the cam 29 has been forced into the path of pin 33 on the crank by the rotating pin 35 on the dial, rotating pin 35 on the dial stopping further clockwise rotation.

With our invention we have accomplished an improved stopping means whereby a driving member, such as a crank or knob, is automatically stopped when a driven member, such as a dial or other part of a device, has moved into a predetermined end position. This is effected according to our invention by the provision of means such as cams or latches which are actuated by an element of the driven device and moved into the path of the driving member or a part thereof. The feature according to which the stopping is initiated by the driven device is important because it insures an accurate movement of the driven device into its end position; and the direct stopping of the driving element is important in that it prevents forces applied to the crank being multiplied by the speed reducing device and applied to sensitive elements of the driven device.

The arrangement which has been described in the present instance limits rotation in both directions. The limits of rotation may be changed by changing the positions of the stationary or the rotary stops or the use of different cams.

What we claim as new and desire to secure by Letters Patent in the United States is:

1. The combination of rotatable driving means, rotatable driven means, speed reducing means between them, and stop means for fixing the angle of rotation of the driven means, the stop means comprising a member actuated by the driven means to lock the driving means.

2. The combination of a rotatable driving member, a speed reducer driven by the member, a rotatable device driven from the reducer at reduced speed as regards the speed of said member, and stop means for limiting the angle of rotation of the device in a certain direction, said stop means comprising a cam and a movable member on the device for moving the cam into a position to prevent operation of the driving member.

3. The combination of a crank having a pin, a device, a reducing gear between the crank and the device for driving the device at reduced speed, and means for limiting the angle of rotation of the device comprising a rotatable cam member, means biasing the cam member away from the crank, a pin fastened to the device for forcing the cam member in a certain position of the device towards the crank to prevent further rotation of the crank.

4. The combination with a device, a crank and speed reducing means for driving the device in either direction at reduced speed, and means for limiting the angle of rotation of the device comprising two rotatable cams, a pin on the crank, spring means normally biasing the cams away from the pin, and a movable pin on the device for moving in a certain position of the device one of the cams into the path of the crank pin.

5. The combination with a device, a crank and speed reducing means for driving the device in either direction at reduced speed, and means for limiting the angle of rotation of the device comprising two cams, a pin on the crank, a spring held on the device for biasing the cams toward the device, two stationary pins, and two rotatable pins on the device.

ANATOLE P. BEREJKOFF.
FRANCIS C. BROCKMAN.